Patented Oct. 25, 1949

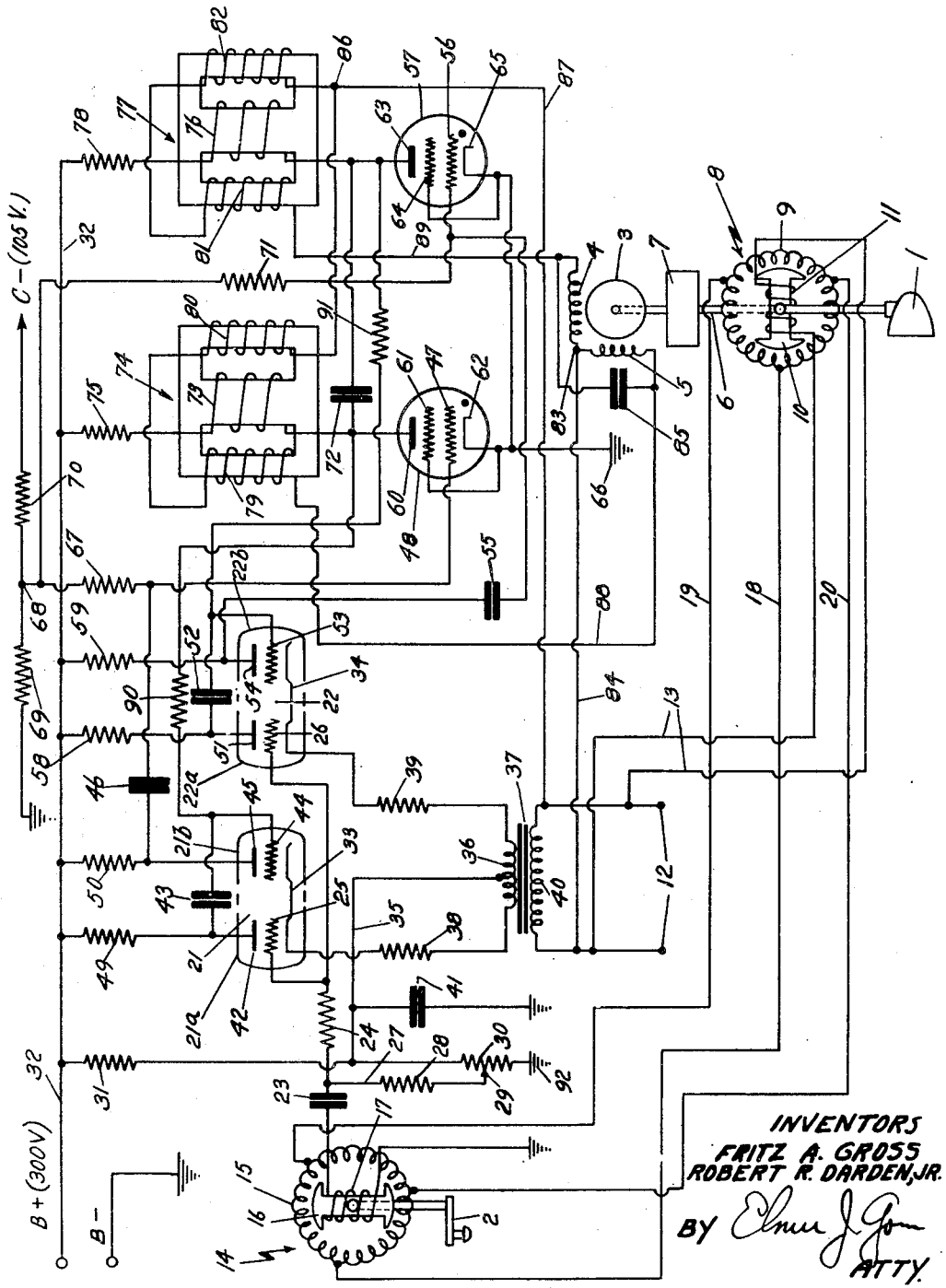

2,486,151

UNITED STATES PATENT OFFICE 2,486,151

ELECTRIC MOTOR CONTROL SYSTEM

Fritz A. Gross, Weston, and Robert R. Darden, Jr., Newton Highlands, Mass., assignors, by mesne assignments, to Raytheon Air Beam, Inc., Newton, Mass., a corporation of Delaware Application October 14, 1947, Serial No. 779,746

12 Claims. (Cl. 318—282)

This invention relates to a control system, and more particularly to a circuit for causing a controlled rotatable device to be rotated back and forth in a repetitive manner through a predetermined angle or sector.

An object of this invention is to devise a control circuit, requiring no moving contacts, which controls a driving motor in such a manner as to automatically drive a driven object back and forth through a predetermined angle.

Another object is to devise a novel sense rectifier trigger-producing circuit for selectively triggering a pair of gas tubes.

A further object is to provide a motor control circuit using saturable reactors for control purposes.

A still further object is to provide a simple yet reliable sector scan circuit for a rotatable directional search antenna.

The foregoing and other objects of the present invention will be best understood from the following description of an exemplification thereof, reference being had to the accompanying drawing, wherein the single figure is a schematic diagram of a system constructed in accordance with this invention.

In the system illustrated, a controlled or driven object 1, such as a directional radiating antenna system for radiating ultra-high frequency waves, is to be caused to move repetitively back and forth through a predetermined but variable angle or sector, the position of the bisector of said angle being controllable by a remotely-located controlling member 2, such as a hand crank. In other words, both the relative direction and the angular width of the sector, through which object 1 is driven back and forth, or through which said object is caused to scan, are controllable. Of course, it is to be understood that controlling member 2 may take any other form which is known in systems of this type. The controlled object 1 is driven back and forth by means of a two-phase alternating current motor 3, having a squirrel-cage rotor, for example, and having two separate field windings 4 and 5 displaced 90° in space from each other, as indicated. The field windings 4 and 5 are supplied from a suitable source of alternating current in a manner to be described hereinafter, in order to energize the field of the motor. Motor 3 drives a drive shaft 6, preferably through a gear reduction drive 7. Controlled object 1 is mounted upon and moved by the drive shaft 6, or said object may be driven from motor 3, directly or indirectly, through any other suitable means. The motion of the controlled object 1 controls a synchro 8 consisting of a stator having a closed stator winding 9 and a rotatable armature 10 carrying a winding 11. The armature 10 is mounted upon and driven by the drive shaft 6, so that the position of armature 10 and winding 11 at all times corresponds to the instantaneous position of controlled member 1. The armature winding 11 is supplied with alternating current from a pair of terminals 12 by means of a pair of leads 13, said terminals 12 being energized from a reference source of alternating voltage, for example a standard 115-volt, 60-cycle source. However, in some cases it may be desirable to provide a separate source of higher frequency for this purpose. Associated with the synchro 8 is a similar synchro 14 consisting of a stator having a closed stator winding 15 and a movable armature 16 carrying a winding 17. Armature 16 is mechanically coupled to controlling object 2 in such a way that motion of said controlling object will rotate the armature 16 in a clockwise or counter-clockwise direction, depending upon the direction of motion of said controlling object. Three equally-spaced points on the stator winding 9 are connected by conductors 18, 19, and 20 to three similarly-spaced points on the stator winding 15.

As is well known, the alternating current field of the armature 10 is reproduced in the space within the stator winding 15, and induces a voltage in the armature winding 17 unless the armature 16 is substantially at right angles to said field. Thus, the amplitude of the voltage induced in the winding 17 is a measure of the deviation of armature 10 from the aforesaid right-angle relationship between armatures 10 and 16, said induced voltage being proportional to the deviation of armature 10 from the aforesaid right-angle relationship between the two armatures. The amplitude of the voltage induced in winding 17 is likewise a measure of the deviation of controlled member 1 from a certain position, which may be called the zero position, in which there is zero voltage induced in winding 17, this zero position corresponding to the bisector of the angle of the sector through which member 1 is to be scanned or moved back and forth.

The voltage generated in the armature winding 17 is applied as the input to a sense rectifier trigger-producing circuit which includes a pair of double triode vacuum tubes 21 and 22, and in order to so apply said voltage, one end of winding 17 is grounded and the other end is connected, through a condenser 23 and a resistor 24, to control grid 25 of tube 21 and to control grid 26 of tube 22, in parallel. In order to permit variation of the proportion of the voltage induced in winding 17 which is applied to the said trigger-producing circuit, to thereby change the angular width of the sector through which object 1 is oscillated or scanned, a lead 27 is connected to a point between condenser 23 and resistor 24, said lead being connected through a resistor 28 to a movable tap 29 on a resistor 30, the lower end of which is grounded as at 92. If desired, the fixed bias applied to grids 25 and 26 may be supplied through any suitable variable means other than resistor 30. The upper end of resistor 30 is connected through a resistor 31 to a direct voltage supply line 32 which is energized from a suitable source of positive B voltage (not shown), on the order of 300 volts, for example.

In order to complete the input circuits to tubes 21 and 22, and in order to apply a direct potential, to cathodes 33 and 34 of tubes 21 and 22, which is above ground or is positive with respect to ground, one end of a lead 35 is connected to a point between resistors 30 and 31 and the opposite end of said lead is connected to the midpoint of the secondary winding 36 of a cathode transformer 37. One end of said secondary winding is connected through a suitable resistor 38 to cathode 33 of tube 21, while the opposite end of said winding is connected through a suitable resistor 39 to cathode 34 of tube 22. The primary winding 40 of step-down transformer 37 is connected directly to the terminals 12 of the alternating reference voltage source, so that the cathodes of tubes 21 and 22 are supplied with an alternating voltage of the same frequency as that of the voltage induced in armature winding 17, the alternating voltages supplied to the two cathodes 33 and 34 being of opposite phase. A bypass condenser 41 may be connected between lead 35 and ground.

The two triode sections 21a and 21b of the tube 21, which have a common cathode 33 as shown, are connected as a two-stage cascade pulse amplifier or pulse transfer circuit, the anode 42 of the first triode 21a being coupled through a condenser 43 to the input grid 44 of the second triode 21b. The anode 45 of the second triode 21b is connected through a condenser 46 to the control grid 47 of a gas tube 48, for example a thyratron, in order to apply a positive trigger pulse, appearing on said anode, to said grid 47. A direct potential is supplied to anode 42 from line 32 through a resistor 49, while a direct potential is supplied to anode 45 from line 32 through a resistor 50. Similarly, the two triode sections 22a and 22b of tube 22, which have a common cathode 34 as shown, are connected as a two-stage cascade pulse amplifier or pulse transfer circuit, the anode 51 of the first triode 22a being coupled through a condenser 52 to the input grid 53 of the second triode 22b. The anode 54 of the second triode 22b is connected through a condenser 55 to the control grid 56 of a second gas tube 57, which is similar to tube 48, in order to apply a positive trigger pulse, appearing on said anode, to said grid 56. A direct potential is supplied to anode 51 from line 32 through a resistor 58, while a direct potential is supplied to anode 54 from line 32 through a resistor 59.

Although tubes 21 and 22 are shown as being of the double triode type, it is desired to be brought out at this point that a pair of separate triode tubes may be used to replace each of the tubes 21 and 22, if desired, the proper connections for such an arrangement being obvious from the connections disclosed.

Gas tubes 48 and 57 are preferably tetrodes, tube 48 including, in addition to control grid 47, an anode 60, a shield grid 61, and a cathode 62. Tube 57 includes, in addition to control grid 56, an anode 63, a shield grid 64, and a cathode 65. Shield grid 61 is connected to cathode 62 either externally or internally of tube 48, while shield grid 64 is connected to cathode 65 either externally or internally of tube 57. Cathodes 62 and 65 are both connected to ground, as indicated at 66.

In order to supply a negative bias to grid 47 of tube 48, said grid is connected through a resistor 67 to a point 68 on a suitable voltage divider, which point is located between a pair of serially-connected resistors 69 and 70, the free end of resistor 69 being grounded and the free end of resistor 70 being connected to a suitable source of negative C voltage (not shown), on the order of 105 volts, for example. Grid 56 of tube 57 is similarly negatively biased, by being connected through a resistor 71 to the same point 68.

Anode 60 is connected, through the direct current control winding 73 of a saturable core reactor 74 and through a resistor 75, to the positive supply line 32. Anode 63 is connected, through the direct current control winding 76 of a second saturable core reactor 77 and through a resistor 78, to supply line 32. Resistors 75 and 78 may be omitted if the windings 73 and 76 have ample resistance to sufficiently limit the current through the gas tubes 48 and 57.

In order to stop the flow of anode current in either one of the two thyratrons when a positive impulse is applied to the grid of the other, a condenser 72 is connected between the two gas tube anodes 60 and 63. This condenser, with resistors 75 and 78, provides a so-called parallel direct current control circuit. When either tube 48 or tube 57 is conducting, condenser 72 charges with such polarity that the terminal thereof connected to the anode of the conducting tube is negative with respect to the other terminal thereof. Firing of the other tube by a positive grid impulse applies a negative voltage to the anode of the first tube, causing it to be extinguished.

The direct current control windings 73 and 76 of saturable reactors 74 and 77 are wound around the central legs of the corresponding three-legged reactors. The two outer legs of each reactor are of smaller cross-section than the central leg thereof, and are capable of becoming saturated by the flux created by the flow of current through the respective control winding. A pair of alternating current windings 79 and 80 are wound around the corresponding outer legs of reactor 74, and these two windings are connected in series in such a way, and the coils are wound in such a direction, that the two alternating fluxes established by the flow of alternating current through these two windings oppose each other in the central leg, so that no alternating voltage is induced in control winding 73. Similarly, a pair of alternating current windings 81 and 82 are wound around the corresponding outer legs of reactor 77, and these two windings are so wound and so connected in series that no alternating voltage is induced in the control winding 76.

Field windings 4 and 5 of the two-phase motor 3 are connected together at a common point 83, and this point is connected by lead 84 to one side of a suitable source of alternating current power, which may be either the same as the reference alternating voltage source or may be a separate source. In the drawing, for purposes of simplicity, the motor is indicated as being supplied with power from the reference voltage source. A condenser 85 is connected between the uncommon or free ends of windings 4 and 5 to give the required approximately 90° phase difference between the voltages supplied to the two windings 4 and 5.

Windings 79 and 80 are connected in series, as stated, and the free end of winding 80 is connected to a point 86, from which point a lead 87 extends to the side of the alternating power source opposite to that to which lead 84 is connected. Windings 81 and 82 are connected in series, as stated, and the free end of winding 82 is also connected to said point 86. The free end of winding 79 is connected, by means of a lead 88, to the uncommon or free end of field winding 5, while the free end of winding 81 is connected, by means of a lead 89, to the uncommon or free end of field winding 4.

For a purpose to be described hereinafter, grid 44 of triode section 21b is connected, through a resistor 90, to anode 60 of gas tube 48, while grid 53 of triode section 22b is connected, through a resistor 91, to anode 63 of gas tube 57.

As described above, the gas tubes 48 and 57 are so interconnected that when one is fired, it automatically extinguishes the other. Since the tubes are supplied from a source of direct current, one or the other of tubes 48 or 57 is always on, and the tubes are alternately fired. For example, if tube 48 is conducting, a positive impulse applied to the grid of tube 57 causes this latter tube to fire, extinguishing tube 48. Tube 57 remains on until a positive impulse is applied to the grid of tube 48, firing tube 48 and thereby extinguishing tube 57. Tube 48 then remains on until a positive grid impulse is again applied to grid 56, again firing tube 57 and thereby extinguishing tube 48, and so on.

When tube 48 is conducting, current flows through the completed anode-cathode circuit therein and through the control winding 73 (of reactor 74) in series therewith. This flow of current through the control winding 73 causes saturation of the two outer legs of saturable reactor 74, decreasing the effective impedance of coils 79 and 80, linked with said legs, to substantially zero. This causes a substantial increase in the flow of alternating current through said coils. The saturable reactors 74 and 77 are both designed in such a manner that they in effect act as switches; that is to say, when gas tube 48 is not conducting, for example, there is no current flowing through control winding 73, and coils 79 and 80 have a substantially infinite impedance, so that there is substantially zero current flowing through them and the reactor 74 is then in effect an open switch. When tube 48 is fired, there is a substantial current flowing through control winding 73, coils 79 and 80 having a substantially zero impedance because of the saturation of the core, so that a large current then flows through said coils and reactor 74 is then in effect a closed switch. Saturable reactor 77 operates in a similar way. When tube 57 is non-conducting, the "switch" 77 is opened and when tube 57 is conducting, the "switch" 77 is closed.

In designing the saturable reactors 74 and 77 to in effect act as alternating current switches in the manner described, it should be kept in mind that the direct current flowing through the control winding of either reactor, as a result of firing the corresponding gas tube, should be of a value substantially greater than that necessary to cause saturation of the outer legs of the reactor, so that these legs remain saturated throughout the cycle of the alternating voltage applied to the alternating current coils on said outer legs.

Since gas tubes 48 and 57 are alternately fired in succession, "switches" 74 and 77 are alternately closed in succession, each "switch" being opened when the other "switch" is closed by the firing of the other gas tube.

When reactor 74 is saturated by the firing of gas tube 48, in effect a pair of circuits are closed through coils 79 and 80, one of them being traced as follows: left-hand terminal 12, lead 84, point 83, field winding 5, lead 88, coils 79, coil 80, point 86, and lead 87 to the right-hand terminal 12. A parallel circuit extends from left-hand terminal 12 through lead 84, point 83, field winding 4, condenser 85, lead 88, coils 79 and 80, point 86, and lead 87, to right-hand terminal 12. It will be noted that, under these conditions, the current flows through field winding 5 directly and through field winding 4 only in series with condenser 85. This results in an approximately 90° phase shift of the voltage applied to winding 4 with respect to that applied to winding 5, and motor 3 rotates in a certain direction, clockwise for example.

When reactor 77 is saturated by the firing of gas tube 57, gas tube 48 is extinguished, the above circuits are in effect broken, and a pair of circuits are closed through coils 81 and 82, one of them being traced as follows: left-hand terminal 12, lead 84, point 83, field winding 4, lead 89, coil 81, coil 82, point 86, and lead 87 to the right-hand terminal 12. A parallel circuit extends from left-hand terminal 12 through lead 84, point 83, field winding 5, condenser 85, lead 89, coils 81 and 82, point 86, and lead 87, to right-hand terminal 12. Under these conditions, the current flows through field winding 4 directly and through field winding 5 only in series with condenser 85. This results in an approximately 90° phase shift of the voltage applied to winding 5 with respect to that applied to winding 4, and motor 3 then rotates in the opposite or counter-clockwise direction.

Thus, by the operation of the circuit as above described using the pair of gas tubes 48 and 57 and the pair of saturable reactors 74 and 77 for the two-phase alternating current motor 3, controlled object 1 is driven in one direction while gas tube 48 is conducting, and is driven in the opposite direction while gas tube 57 is conducting. The sense rectifier trigger-producing circuit including tubes 21 and 22 functions, in a manner to be described, to provide a positive grid impulse to the gas tube not conducting, at the proper time (which is when the object 1 approaches the edge of the sector being scanned), to switch conduction from one gas tube to the other to thereby reverse the direction of rotation of motor 3. An impulse is provided, by said trigger circuit, to the proper gas tube, when said controlled object 1 is near each side edge of the sector being scanned, to switch conduction from one gas tube to the other to thereby reverse the direction of rotation of motor 3 at each side edge of said sector.

It should be apparent that, due to mechanical inertia, even after an impulse is provided to switch conduction from one gas tube to the other, a certain time must elapse before the motor will slow down, come to a stop, and begin to rotate in the opposite direction. In other words, the motor 3 does not and cannot reverse instantaneously. Therefore, there is a fixed minimum value of sector width, on the order of ten degrees for example, below which it is not possible to go without the system becoming unstable. This minimum value of sector width occurs when impulses for firing the gas tubes are produced simultaneously with the passage of object 1 through the bisector of the sector angle. In order to obviate the possibility of instability of the circuit, a limiting device must be provided on the sector width control to limit the adjustment of said control, in the direction of decreasing sector widths, to a point corresponding to the minimum stable sector width. For any particular drive motor used, the inertia or time lag is determinable.

The maximum sector width possible without the system becoming unstable is equal to 180° plus the minimum value of sector width. In order to obviate the possibility of instability of the circuit at this end of the sector width control, also, a limiting device must be provided on the sector width control, in the direction of increasing sector widths, to a point corresponding to the maximum stable sector width.

As previously explained, the peak amplitude of the alternating voltage induced in winding 17 at any instant is a measure of the deviation of armature 10 and object 1 from the above-defined zero position at that instant. The maximum possible alternating peak voltage induced in winding 17, which we will term the maximum peak grid signal, is induced therein when armatures 10 and 16 are parallel to each other. For any particular synchros used, this voltage is known or predetermined.

A predetermined variable direct voltage bias, positive with respect to ground, is applied to grids 25 and 26 by the connection of grid lead 27 to the movable tap 29 on the potentiometer 30—31 connected between the positive voltage lead 32 and ground. Any suitable form of limiting device (not shown) is preferably provided to limit the minimum bias applied to grids 25 and 26 to a predetermined rather small positive voltage with respect to ground. This limiting device on the minimum bias provides the necessary limitation on the sector width control 29 in the direction of increasing sector widths. Any suitable form of limiting device (not shown) is also provided to limit the maximum bias applied to grids 25 and 26 with respect to ground. This limiting device on the maximum bias provides the necessary limitation on the sector width control 29 in the direction of decreasing sector widths.

An alternating voltage is applied to the cathodes 33 and 34 by secondary winding 36, the peak value of this voltage being made greater than the maximum peak grid signal defined above.

Tubes 21 and 22 preferably have such characteristics that cutoff thereof is effected when a predetermined rather small negative voltage with respect to the cathodes thereof is applied to the corresponding control grids 25 and 26.

The direct voltage applied to cathodes 33 and 34 by lead 35 biases these cathodes to a voltage, which is positive with respect to ground 92, or is above ground, by a substantial amount. This amount must be just slightly less than the sum of the maximum peak grid signal, the peak value of the alternating voltage applied to the cathodes 33 and 34, the effective grid-cathode cutoff voltage of the tubes, and the minimum possible grid bias voltage (that applied when tap 29 is in its lowest position on resistor 30). This potential of the cathodes with respect to ground must be just less than the aforesaid sum, in order to insure that the tubes 21a and/or 22a will conduct under these conditions of the extreme maximum sector width. For example, if the maximum peak grid signal is 50 volts, if the peak value of the alternating voltage applied to the cathodes is 60 volts, if the effective cutoff voltage of the tubes is 8 volts, and if the bias on the grids is 15 volts above ground when tap 29 is in its lowermost position, then the cathodes would have to be biased to a point just slightly less than 133 volts above ground. Under these conditions, the voltage on grids 25 and 26 is swinging to 65 volts above ground (50 plus 15). In order to cause the triode sections 21a and 22a to just conduct under these conditions, the cathode voltage must swing down to just less than 8 volts above the grid potential, or just less than 73 volts (65 plus 8) above ground. The cathode voltage is swinging 60 volts downwardly (and also upwardly) about its fixed bias value, so that said fixed bias value must be just less than 133 volts (73 plus 60).

It will be recalled that the cathode bias potential value determined as above described was for the greatest possible sector width, or the least possible value of bias voltage on grids 25 and 26, making it necessary for the maximum peak grid signal to be induced in winding 17 before one of the tubes 21a or 22a goes above cutoff or reaches the conducting condition. The maximum peak grid signal is induced in winding 17 when armatures 10 and 16 are parallel to each other, so that under these conditions, as will later appear, a sector width of substantially 180° is obtained, plus of course the minimum possible sector width, which is the angle through which object 1 travels during the time interval required due to mechanical inertia of motor 3.

Grid 44 of triode section 21b is tied to anode 60 of gas tube 48 through a resistor 90, as above described. The potential of anode 60 is therefore applied to said grid through said resistor, as a bias voltage for said grid. When tube 48 is non-conducting, the potential on anode 60 thereof is the high positive potential of line 32, so that a positive potential is placed on grid 44 with respect to cathode 33, causing grid current to be drawn, so that the net potential on grid 44 is that of line 32 less the voltage drops in resistors 75 and 90, and winding 73. This net potential on grid 44 is small as compared to that of line 32, but is positive as compared to that of the cathode 33. This net potential is less than the cutoff value of triode section 21b, so that, under these conditions, triode section 21b is in the conducting condition or is passing plate current. When tube 48 is triggered or fired by a positive impulse applied to its grid 47, the voltage on anode 60 drops a substantial amount, to a value substantially equal to the low voltage drop of the arc discharge in said tube. This low voltage is now applied to grid 44 and is sufficiently negative with respect to cathode 33 (which, it will be remembered, is biased a substantial amount positive with respect to ground) to cut off the plate current in triode section 21b. Therefore, when and as long as tube 48 is non-conducting, triode section 21b is conducting, but when and as long as tube 48 is conducting, triode section 21b is non-conducting or is cut off.

Grid 53 of triode section 22b is tied to anode 63 of gas tube 57 through a resistor 91, as above described. This connection functions similarly to that just described, to cause triode section 22b to conduct when and as long as tube 57 is non-conducting, and to cause triode section 22b to be cut off when and as long as tube 57 is conducting.

We will assume as a starting point that gas tube 48 is conducting, and will assume that when this tube is conducting, motor 3 is caused to rotate in such a direction as to rotate armature 10 in a clockwise direction. Under these conditions, when gas tube 48 is conducting, gas tube 57 is extinguished, triode section 21b is cut off, and triode section 22b is conducting, due to the connections above described.

When the controlled object or antenna 1 is driven by motor 3 so as to produce an angular displacement of the armature 10 with respect to armature 16 from the zero or perpendicular relation illustrated, a voltage appears across the armature winding 17, as already described. Assuming first a steady-state condition, which means that the armature 16 is stationary, the voltage appearing across winding 17 will be either in phase or 180° out of phase with the reference voltage at the input terminals 12, depending upon whether armature 10 is on one side or the other of its zero position with respect to armature 16. If we assume that the voltage in winding 17 is in phase with the reference voltage when armature 10 moves clockwise from its zero position with respect to armature 16, then the voltage in winding 17 will be 180° out of phase with the reference voltage when armature 10 moves counterclockwise from its zero position with respect to armature 16.

As described above, triode sections 21a and 22a are normally non-conducting, due to the substantial bias of cathodes 33 and 34 above ground. The voltage in winding 17 is applied to the two grids 25 and 26 in parallel, as previously described. Windings 36 and 40 of cathode transformer 37 are so related that when a voltage in phase with the reference voltage is applied to grids 25 and 26, the voltages applied to grid 26 and cathode 34 are 180° out of phase with each other, so that one of these two voltages is increasing with respect to its own zero line while the other is decreasing with respect to its own zero line.

As explained above, the zero or base line (with respect to ground), about which the reference alternating voltage applied to cathodes 33 and 34 oscillates, is determined by the direct voltage applied to said cathodes by lead 35, and in the example given is just slightly less than 133 volts above ground. Since cathodes 33 and 34 are connected to opposite ends of winding 36, the alternating voltages applied to the two cathodes are 180° out of phase with respect to each other. The zero or base line (with respect to ground), about which the alternating voltage applied to grids 25 and 26 from winding 17 oscillates, is determined by the setting of tap 29 on resistor 30, this setting being capable of manual adjustment.

As explained heretofore, the voltage induced in winding 17 is proportional to the angular deviation of armature 10 from the right-angle relationship between the two armatures 10 and 16, so that as this angular deviation increases because of the angular movement of armature 10, the amplitude of the alternating voltage applied to grids 25 and 26 increases.

Under the conditions assumed, with gas tube 48 conducting and armature 10 rotating in a clockwise direction from the zero position illustrated, the alternating voltage applied to grids 25 and 26 swings upward from its zero or base line during alternate half-cycles, and the amplitude of this voltage increases as the clockwise deviation of armature 10 increases from the zero position illustrated. During the upward swings of the alternating voltage applied to grid 26, the reference alternating voltage applied to cathode 34 is swinging downwardly from its zero line, so that the grid voltage peaks occur at the same time as do the points at which the cathode 34 reaches its lowest or minimum voltage above ground. As the voltage on grid 26 continues to increase, said voltage finally attains a peak value (65 volts above ground in the example given) which is sufficient, because the grid voltage peak occurs simultaneously with the minimum value of cathode voltage, to cause triode section 22a to conduct. The sudden conduction of tube 22a increases the plate current thereof and produces a negative voltage impulse at anode 51, this impulse being transmitted through condenser 52 and being utilized to cut off triode section 22b which, as stated above, was previously conducting. The cutting off of tube 22b produces a rectified positive impulse or trigger at anode 54, which impulse is transmitted through condenser 55 to grid 56, firing tube 57 and thereby extinguishing tube 48. Since tube 57 is now conducting, motor 3 reverses its direction of rotation and now drives antenna 1 in a direction corresponding to a counterclockwise direction of rotation of armature 10.

Although the alternating voltage in winding 17 is applied to both grids 25 and 26 in parallel, triode section 21a cannot conduct, rather than triode section 22a, in an improper manner. This is because of the fact that, during the half-cycles in which the voltage on cathode 33 reaches its minimum value, when conduction could occur, the voltage on grid 25 is swinging downwardly from its zero line and has a value, throughout these half-cycles, substantially beyond the grid-cathode cutoff voltage of the tube. As an added protection, triode section 21b is kept cut off while tube 48 is conducting. A positive impulse, to fire one of the gas tubes, can be produced only by the cutting off of either of the triode sections 21b or 22b. No such positive impulse can be produced, therefore, by the cutting off of section 21b, even if section 21a does conduct improperly while tube 48 is conducting, since section 21b is already cut off during this time.

The absolute value of peak grid voltage at any time is the result of two components, one being the amount of angular deviation of armature 10 from its zero position and the other being the absolute value of the direct grid bias, which latter value is variable by movement of tap 29 on resistor 30. By moving tap 29 upwardly from its lowermost position, the direct voltage bias on grids 25 and 26 is increased, moving the zero or base line of the alternating grid voltage upwardly. When this zero line is moved upwardly, the predetermined peak value of alternating grid voltage necessary to cause sections 21a or 22a to conduct, to cause reversal of motor 3, is reached at a smaller angular deviation of armature 10. Thus the angle through which antenna 1 rotates or scans is decreased, and the sector width is reduced. In an analogous manner, by moving tap 29 downwardly, the sector width may be increased. Thus, tap 29 provides a control for the width of the sector desired to be scanned by antenna 1.

To return to a description of operation of the system, when tube 57 fires, triode section 21b is again allowed to conduct, due to the extinguishment of tube 48, and triode section 22b is held cut off by the conduction of tube 57.

While armature 10 is rotating in the counterclockwise direction, returning toward the zero position, the phase relationships between the cathode and grid voltages of tubes 21a and 22a are the same as heretofore explained, so that triode section 21a cannot conduct. The holding of section 22b in the cutoff condition, by conduction of tube 57, assists in preventing spurious positive impulses from being applied to grid 56 of tube 57 after said tube has been fired.

When armature 10 passes beyond the zero position, rotating in the counterclockwise direction, the voltage induced in winding 17 will be 180° out of phase with the reference voltage, so that now the voltage applied to grids 25 and 26 will be in phase with the voltage applied to cathode 34 and 180° out of phase with the voltage applied to cathode 33. The amplitude of the alternating grid voltage increases as the counterclockwise deviation of armature 10 increases from the zero position. Due to the phase relations now existing, the grid voltage peaks now occur at the same time as do the points at which cathode 33 reaches its lowest or minimum value above ground. As the voltage on grid 25 continues to increase, said voltage finally attains a peak value which is sufficient, because said peak occurs simultaneously with the minimum value of cathode voltage, to cause triode section 21a to conduct. This peak value is reached when armature 10 has a deviation on one side of its zero position equal to the deviation on the opposite side when the previous reversal of motor 3 occurred. In other words, the zero position of armature 10 bisects the sector through which armature 10 moves or scans.

The conduction of tube 21a produces a negative voltage impulse at anode 42, this impulse being transmitted through condenser 43 and being utilized to cut off triode section 21b, which was previously conducting. The cutting off of tube 21b produces a rectified positive impulse or trigger at anode 45, which impulse is transmitted through condenser 46 to grid 47, firing tube 48 and thereby extinguishing tube 57. Since tube 48 is now conducting, motor 3 again reverses its direction of rotation, and drives antenna 1 in the original direction, that is, in a direction corresponding to a clockwise rotation of armature 10.

Triode section 22a cannot conduct, rather than triode section 21a, at this edge of the sector, in an improper manner. During the half-cycles in which the voltage on cathode 34 reaches its minimum value, when conduction could occur, the voltage on grid 26 is swinging downwardly from its base or zero line and has a value, throughout these half-cycles, substantially beyond the grid-cathode cutoff voltage of the tube. As an added protection, triode section 22b is kept cut off while tube 57 is conducting. No positive impulses can be produced by the cutting off of section 22b, even if section 22a does conduct improperly while tube 57 is conducting, since section 22b is already cut off during this time.

When tube 48 again fires, triode section 22b is again allowed to conduct, due to the extinguishment of tube 57, and triode section 21b is held cut off, by the conduction of tube 48.

A saving in system current consumption is effectuated by the maintaining of triode sections 21b and 22b cut off while the corresponding gas tubes are conducting, after these sections have produced a positive impulse as desired.

While armature 10 is again rotating in the clockwise direction, returning toward the zero position, the phase relations between the cathode and grid voltages of tubes 21a and 22a are the same as when armature 10 was rotating in the counterclockwise direction through this same half-sector. Triode section 22a cannot conduct during this time, because of the oppositely-phased cathodes 33 and 34. The holding of section 21b in the cutoff condition, by conduction of tube 48, assists in preventing spurious positive impulses from being applied to grid 47 of tube 48 after said tube has been fired, which impulses could be produced at the extreme edge of the sector during the mechanical time lag of motor 3 and armature 10, since the r..id voltage at this edge is sufficient to cause conduction in tube 21a.

When armature 10 has returned to the zero position, rotating in the clockwise direction as a result of the firing of tube 48, the assumed starting point of the above-described operation has again been reached, and the process repeats itself as long as the system is energized. The system therefore operates or functions to produce oscillatory angular motion of antenna 1 back and forth through a sector, the angular width of which is variable by movement of tap 29.

Reversal of the direction of rotation of motor 3 can occur only when armature 10 has a predetermined angular deviation on either side of its zero position with respect to armature 16, since it is only when this predetermined angular deviation exists that there is sufficient voltage induced in winding 17, and applied to grids 25 and 26, to cause current flow in tubes 21a or 22a. Therefore, armature 10 reciprocates or oscillates back and forth through a sector, the bisector of the angle of which is determined by the position of armature 16, and by rotation of crank 2 to rotate armature 16, the direction of the bisector of the angle through which antenna 1 moves may be varied at will.

The double triode tubes 21 and 22 produce a rectified positive voltage impulse or trigger at either anode 45 or anode 54, depending on the relative direction or sense of armature 10 with respect to its zero position. The circuit including tubes 21 and 22 may therefore be termed a sense rectifier trigger circuit.

It will be seen, from all of the above, that we have devised an efficient control circuit, requiring no moving contacts, for controlling a driving motor in such a manner as to automatically drive a driven object back and forth through a predetermined angle or sector.

Of course, it is to be understood that this invention is not limited to the particular details as described above, as many equivalents will suggest themselves to those skilled in the art. For example, instead of the three-phase synchros 8 and 14 illustrated, two-phase synchros, known as "resolvers," could alternatively be used for the same purpose, if desired for greater accuracy. Although, in the circuit shown, the signal voltage is applied to the two grids 25 and 26 in the same sense and the reference voltage is applied to the two cathodes 33 and 34 in opposite senses, the signal voltage could equally well be applied to the cathodes and the reference voltage to the grids, while one of the voltages could be applied to the two grids in opposite senses and the other voltage to the two cathodes in the same sense; in fact, any combination of reference and signal voltages, and the same or opposite senses, could be used, so long as either the reference or the signal voltage is applied to the cathodes and the other to the grids, and so long as the grids are fed in the same sense and the cathodes in opposite senses, or vice versa. Various other variations will suggest themselves. It is accordingly desired that the appended claims be given a broad interpretation commensurate with the scope of this invention within the art.

What is claimed is:

1. In a motor control system, an alternating current motor, a saturable reactor having at least a direct current saturating winding and an alternating current winding, said reactor being adapted to act as a closed alternating current switch in response to the flow of direct current through said saturating winding, means connecting the alternating current winding of said reactor between a source of alternating current and said motor, and discharge means in series with said saturating winding and a source of direct current for causing direct current to flow through said saturating winding to close said switch and thereby energize said motor from said source.

2. In a motor control system, an alternating current motor, a saturable reactor having at least a direct current saturating winding and an alternating current winding, said reactor being adapted to act as a closed alternating current switch in response to the flow of direct current through said saturating winding, means connecting the alternating current winding of said reactor between a source of alternating current and said motor, and means for causing direct current to flow through said saturating winding to close said switch and thereby energize said motor from said source, said last-named means comprising a controllable gas discharge tube connected in series between a source of direct current and said saturating winding.

3. In a motor control system, a two-phase motor having a pair of windings, a pair of saturable reactors each having at least a direct current saturating winding and an alternating current winding, said reactors being adapted to act as closed alternating current switches in response to the flow of direct current through the saturating windings thereof, means connecting the alternating current winding of one of said reactors between a source of alternating current and one motor winding, means connecting the alternating current winding of the other reactor between said source and the other motor winding, and controllable discharge means connected in series with each of said saturating windings and a source of direct current for causing direct current to flow alternatively through the saturating windings of said two reactors to close the corresponding switches to thereby energize said motor from said source in opposite senses.

4. In a motor control system, a two-phase motor having a pair of windings, a pair of saturable reactors each having at least a direct current saturating winding and an alternating current winding, said reactors being adapted to act as closed alternating current switches in response to the flow of direct current through the saturating windings thereof, means connecting the alternating current winding of one of said reactors between a source of alternating current and one motor winding, means connecting the alternating current winding of the other reactor between said source and the other motor winding, and means for causing direct current to flow alternatively through the saturating windings of said two reactors to close the corresponding switches to thereby energize said motor from said source in opposite senses, said last-named means comprising a pair of controllable gas discharge tubes, one of said tubes being connected in series between a source of direct current and each of said saturating windings.

5. In a motor control system, a two-phase motor having a pair of saturable reactors each having at least a direct current saturating winding and an alternating current winding, said reactors being adapted to act as closed alternating current switches in response to the flow of direct current through the saturating windings thereof, means connecting the alternating current winding of one of said reactors between a source of alternating current and one motor winding, means connecting the alternating current winding of the other reactor between said source and the other motor winding, and means for causing direct current to flow alternately through the saturating windings of said two reactors to close the corresponding switches to thereby energize said motor from said source successively in opposite senses, said last-named means including a pair of alternately-conducting gas discharge tubes, one of said tubes being connected in series between a source of direct current and each of said saturating windings.

6. In a motor control system, a two-phase motor having a pair of windings, a pair of saturable reactors each having at least a direct current saturating winding and an alternating current winding, said reactors being adapted to act as closed alternating current switches in response to the flow of direct current through the saturating windings thereof, means connecting the alternating current winding of one of said reactors between a source of alternating current and one motor winding, means connecting the alternating current winding of the other reactor between said source and the other motor winding, a pair of controllable gas discharge tubes, one of said tubes being connected in series between a source of direct current and each of said saturating windings, and means for causing said tubes to alternately conduct to thereby cause direct current to flow alternately through the saturating windings of said two reactors.

7. In a motor control system, a two-phase motor having a pair of windings, a pair of saturable reactors each having at least a direct current saturating winding and an alternating current winding, said reactors being adapted to act as closed alternating current switches in response to the flow of direct current through the saturating windings thereof, means connecting the alternating current winding of one of said reactors between a source of alternating current and one motor winding, means connecting the alternating current winding of the other reactor between said source and the other motor winding, a pair of controllable gas discharge tubes, one of said tubes being connected in series between a source of direct current and each of said saturating windings, a source of alternating voltage reversible in phase, and means responsive to the phase of said alternating voltage for causing a corresponding one of said tubes to conduct to thereby cause direct current to flow through the corresponding reactor saturating winding.

8. In a motor control system, a two-phase motor having a pair of windings, a pair of saturable reactors each having at least a direct current saturating winding and an alternating current winding, said reactors being adapted to act as closed alternating current switches in response to the flow of direct current through the saturating windings thereof, means connecting the alternating current winding of one of said reactors between a source of alternating current and one motor winding, means connecting the alternating current winding of the other reactor between said source and the other motor winding, a pair of controllable gas discharge tubes, one of said tubes being connected in series between a source of direct current and each of said saturating windings, a source of signal voltage reversible in phase and of a predetermined frequency, and a sense rectifier including a pair of electron discharge tubes having their grids connected to said signal voltage source and their cathodes connected to a reference voltage source of said predetermined frequency, said sense rectifier being responsive to the phase sense of said signal voltage for causing a corresponding one of said gas tubes to conduct to thereby cause direct current to flow through the corresponding reactor saturating winding.

9. In a sector scan system, a driven member adapted to be driven back and forth through a sector, a two-phase motor for driving said member through said sector, means for controlling the extent of said sector comprising means for generating an alternating voltage in response to a deviation of said driven member from a predetermined position, said voltage being reversible in phase sense depending upon the direction of said deviation, a pair of saturable reactors each having at least a direct current saturating winding and an alternating current winding, said reactors being adapted to act as closed alternating current switches in response to the flow of direct current through the saturating windings thereof, means connecting the alternating current winding of one of said reactors between a source of alternating current and one motor winding, means connecting the alternating current winding of the other reactor between said source and the other motor winding, and means responsive to the phase sense of said alternating voltage for causing direct current to flow alternatively through one or the other of said saturating windings depending upon said phase sense, said last named means being responsive to said alternating voltage only when said voltage exceeds a predetermined value.

10. In a sector scan system, a driven member adapted to be driven back and forth through a sector, a two-phase motor for driving said member through said sector, means for generating an alternating voltage in response to a deviation of said driven member from a predetermined position, said voltage being reversible in phase sense depending upon the direction of said deviation, a pair of saturable reactors each having at least a direct current saturating winding and an alternating current winding, said reactors being adapted to act as closed alternating current switches in response to the flow of direct current through the saturating windings thereof, means connecting the alternating current winding of one of said reactors between a source of alternating current and one motor winding, means connecting the alternating current winding of the other reactor between said source and the other motor winding, a pair of controllable gas discharge tubes, one of said tubes being connected in series between a source of direct current and each of said saturating windings, and means responsive to the phase sense of said alternating voltage for causing a corresponding one of said tubes to conduct to thereby cause direct current to flow through the corresponding reactor saturating winding.

11. In a sector scan system, a driven member adapted to be driven back and forth through a sector, a two-phase motor for driving said member through said sector, means for generating a signal voltage of a predetermined frequency in response to a deviation of said driven member from a predetermined position, said voltage being reversible in phase sense depending upon the direction of said deviation, a pair of saturable reactors each having at least a direct current saturating winding and an alternating current winding, said reactors being adapted to act as closed alternating current switches in response to the flow of direct current through the saturating windings thereof, means connecting the alternating current winding of one of said reactors between a source of alternating current and one motor winding, means connecting the alternating current winding of the other reactor between said source and the other motor winding, and a sense rectifier including a pair of electron discharge tubes having their grids connected to said signal voltage and their cathodes connected to a reference voltage source of said predetermined frequency, said sense rectifier being responsive to the phase sense of said signal voltage for causing direct current to flow alternatively through one or the other of said saturating windings depending upon said phase sense, and means for varying the extent of said sector comprising means for adjusting the minimum value of said signal voltage to which said sense rectifier will respond.

12. In a sector scan system, a driven member adapted to be driven back and forth through a sector, a two-phase motor for driving said member through said sector, means for generating a signal voltage of a predetermined frequency in response to a deviation of said driven member from a predetermined position, said voltage being reversible in phase sense depending upon the direction of said deviation, a pair of saturable reactors each having at least a direct current saturating winding and an alternating current winding, said reactors being adapted to act as closed alternating current switches in response to the flow of direct current through the saturating windings thereof, means connecting the alternating current winding of one of said reactors between a source of alternating current and one motor winding, means connecting the alternating current winding of the other reactor between said source and the other motor winding, a pair of controllable gas discharge tubes, one of said tubes being connected in series between a source of direct current and each of said saturating windings, and a sense rectifier including a pair of electron discharge tubes having their grids connected to said signal voltage and their cathodes connected to a reference voltage source of said predetermined frequency, said sense rectifier being responsive to the phase sense of said signal voltage for causing a corresponding one of said gas tubes to conduct to thereby cause direct current to flow through the corresponding reactor saturating winding.

FRITZ A. GROSS.
ROBERT R. DARDEN, JR.

REFERENCES CITED

The following references are of record in the file of this patent:

UNITED STATES PATENTS

| Number | Name | Date |
|---|---|---|
| 1,955,322 | Brown | Apr. 17, 1934 |
| 1,965,416 | Howard | July 3, 1934 |
| 2,070,462 | White | Feb. 9, 1937 |
| 2,402,210 | Ryder et al. | June 18, 1946 |
| 2,414,936 | Edwards et al. | Jan. 28, 1947 |
| 2,424,568 | Isbister et al. | July 29, 1947 |